June 26, 1951  H. J. SIEKMANN ET AL  2,558,275
LATHE CONTROL MECHANISM

Filed June 21, 1949  3 Sheets-Sheet 1

INVENTORS.
HAROLD J. SIEKMANN
HARRY C. KEMPER
NELSON D. COOPER
BY
Willard S. Grimm
ATTORNEY.

INVENTORS.
HAROLD J. SIEKMANN,
HARRY C. KEMPER,
NELSON D. COOPER
BY Willard S. Grover
ATTORNEY.

June 26, 1951  H. J. SIEKMANN ET AL  2,558,275
LATHE CONTROL MECHANISM
Filed June 21, 1949  3 Sheets-Sheet 3
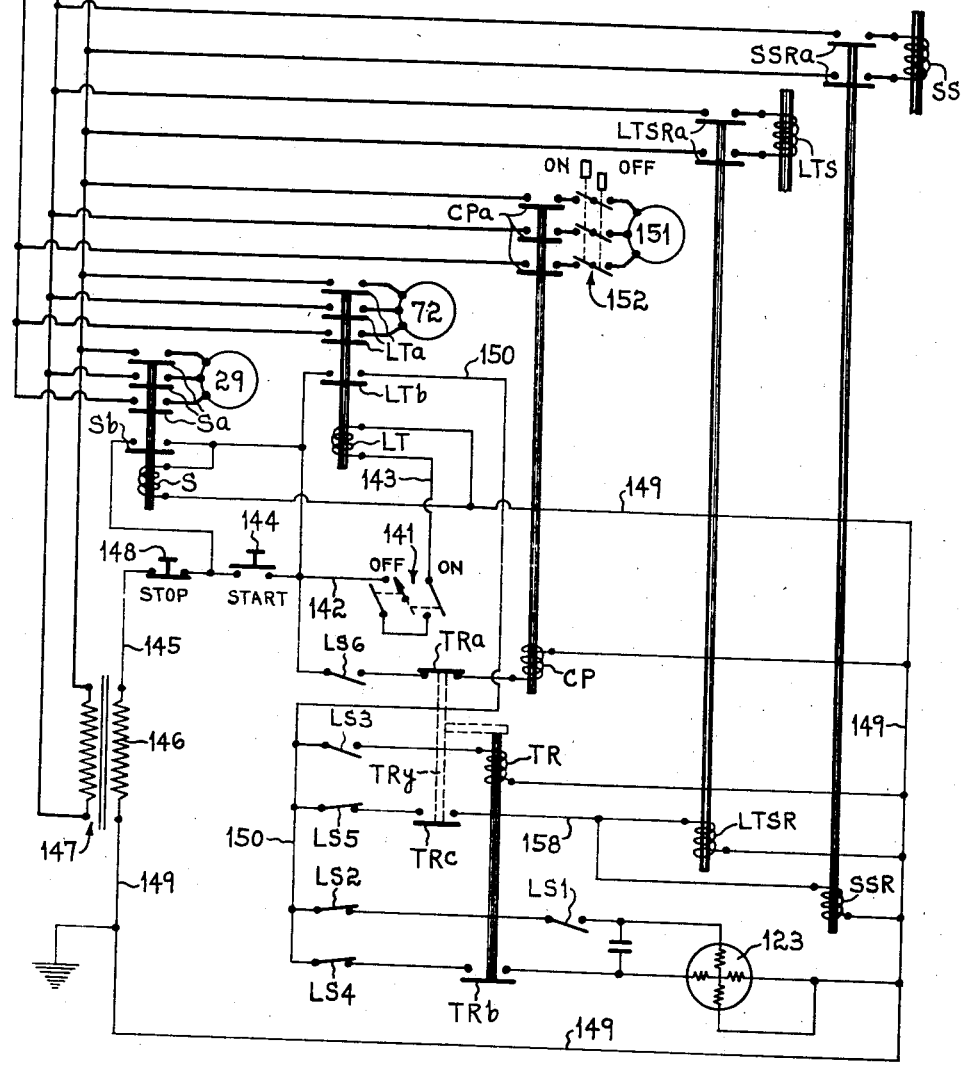
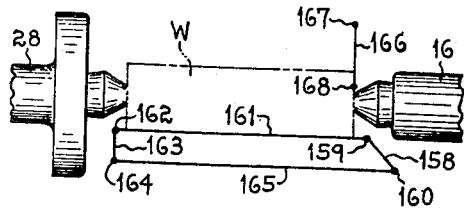
FIG.4
INVENTORS.
HAROLD J. SIEKMANN,
HARRY C. KEMPER,
NELSON D. COOPER
BY
Willard S. Grover
ATTORNEY.

Patented June 26, 1951

2,558,275

UNITED STATES PATENT OFFICE 2,558,275

LATHE CONTROL MECHANISM

Harold J. Siekmann, Cincinnati, Harry C. Kemper, Goshen Township, Clermont County, and Nelson D. Cooper, Mariemont, Ohio, assignors to The R. K. Le Blond Machine Tool Company, Cincinnati, Ohio, a corporation of Delaware Application June 21, 1949, Serial No. 100,342

9 Claims. (Cl. 82—2)

This invention pertains to improvements in control for machine tools and is particularly directed to improvements in lathe control mechanism.

One of the objects of this invention is to provide electric control mechanism and a control circuit for effecting an automatic cycle of operation for a lathe.

Another object of this invention is to provide an electric control apparatus for a lathe in which the feed and rapid traverse movements of the cutting tool are controlled by the interaction between the lathe carriage and apron and an axially reciprocatable feed and rapid traverse drive rod and trip bar.

Still another object is to provide in a lathe control mechanism, a novel tool relief mechanism for the cross slide of the lathe which is operated in timed relationship with the longitudinal movement of the carriage.

It is also an object to provide interlock mechanism between the feed mechanism of the lathe and the spindle stop and start control mechanism of the machine so that the feed and spindle rotation are operated in a predetermined relationship.

Further features and advantages of this invention will appear from the detailed description of the drawings in which:

Figure 3 is an electric circuit diagram used in conjunction with the lathe.

Figure 4 is a diagram showing the path of movements of the cutting tools during an automatic operating cycle of the machine.

Figure 1:
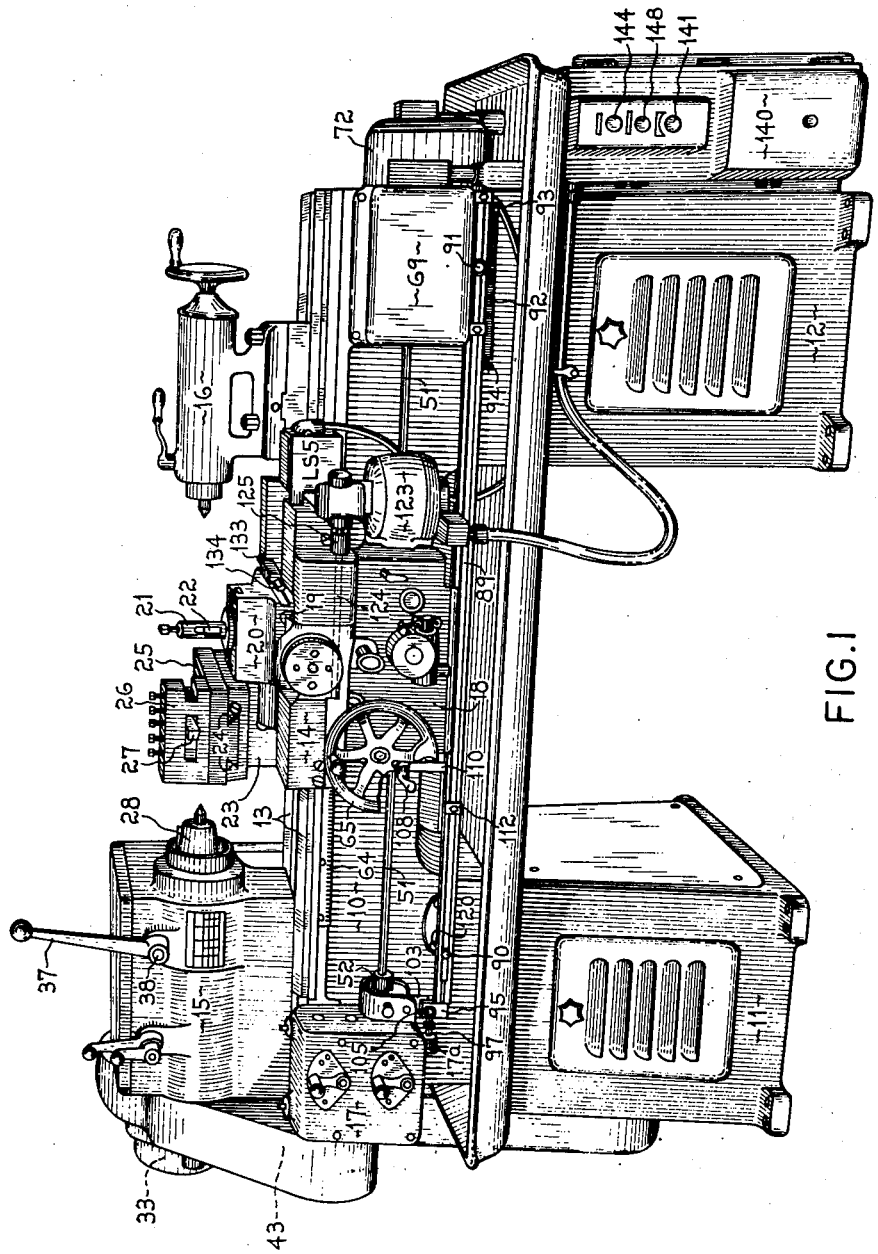
Figure 1 is a front perspective view of a lathe incorporating the features of this invention.

As illustrative of a machine tool to which this invention is particularly well adapted, there is shown in Figure 1 a typical type of lathe known as a rapid production lathe comprising a bed 10 mounted on the legs 11 and 12 and having longitudinally extending bed ways 13 upon which is reciprocatably mounted the carriage 14. Also carried on the bed 10 is the headstock 15, the tailstock 16, and the feed box 17. Depending downwardly from the front of the carriage is the apron 18 and reciprocatably mounted for transverse movement on the guideways 19 on the carriage is the cross slide 20. The cross slide carries the usual tool post 21 and the cutting tool 22. The lathe may also have a rear tool slide or facing attachment comprising a bracket 23 fixed to the rear of the lathe bed 10 and having guideways 24 upon which slides the rear tool slide 25 which in turn supports the rear tool block 26 and a cutting tool 27.

The work spindle of the lathe is driven from the main drive motor 29 which has a pulley 30 on its shaft over which operates the belts 31 which in turn drive the clutch pulley 32 suitably journaled on the headstock 15. A conventional multiple-disc clutch 33 serves to connect or disconnect power from the constantly operating main drive motor to the input shaft 34 of the headstock transmission of the lathe. The clutch is operated by the push rod 35 having a spool 36 fixed thereto and engaged by the spindle start and stop lever 37 pivotally mounted on the headstock on a suitable shaft 38. When the lever is in the "stop" position 37a shown in Figure 2, the clutch 33 is disengaged, and when the lever is in the "run" position 37b, the clutch is engaged to apply the drive motor 29 to rotate the work spindle. Power from the input shaft 34 of the headstock may be connected at different rates of speed to the work spindle 28 in a well known manner, as by the various sliding change gears indicated generally at 39, 40 and 41, so as to rotate the spindle at the desired cutting speed.

Power for driving the tool slides 20 and 25 at feeding rates is derived from the work spindle, power being taken off from a sprocket 42 fixed to the spindle which drives the chain 43 which in turn connects with the sprocket 44 on the intermediate shaft 45 carried in the feed box 17. A gear 46 is connected in driving relationship with the sprocket 44 and in turn drives the gear 47 fixed on the input shaft 48 of the feed box 17. A series of shiftable gear sets indicated generally at 49 provides different feed rates to the output shaft 50 of the feed box.

Figure 2:
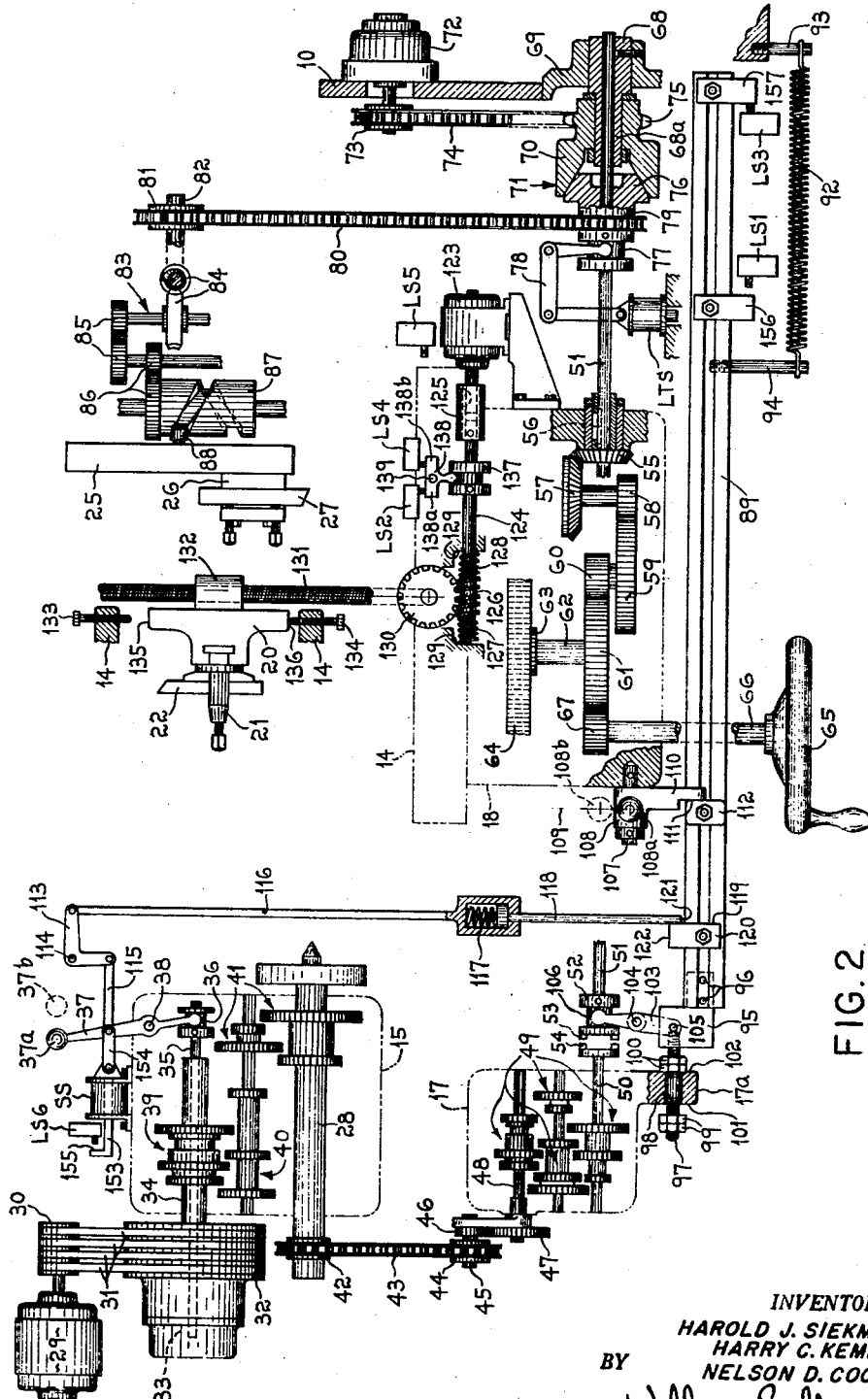
Figure 2 is a diagram showing the operating and control mechanism of the lathe shown in Figure 1.

Coaxially positioned with the output shaft 50 of the feed box is the rotatable and axially reciprocatable feed and rapid traverse drive rod or shaft 51 having a clutch spool 52 fixed to its left hand end, Figures 1 and 2, which has clutch teeth 53 adapted to engage mating clutch teeth 54 carried on the end of the output shaft 50 of the feed box when the rod is moved to its left position. The clutch teeth 53—54 comprise the feed clutch mechanism of the lathe. The rod passes through the apron 18 and the driving bevel pinion 55 journaled in the apron against axial movement. The bevel pinion has a keyed driving bore 56 so that the drive rod 51 may slide through it and at the same time drive the apron mechanism during the movement of the apron and carriage along the bed. The driving bevel gear 55 drives the usual apron gearing shown diagrammatically as the bevel gear 57 which is connected to the gear 58 which in turn drives the gearing 59 and 60, and the gear 61 on the rack pinion shaft 62 upon which is the rack pinion 63 which engages the rack 64 fixed on the bed 10 of the lathe. In this way rotation of the drive rod 51 effects longitudinal movement of the carriage along the bed. Manual actuation of the carriage may be had by the usual hand wheel 65 on the handwheel shaft 66 having the pinion 67 in engagement with the gear 61 on the rack pinion shaft 62.

The right hand end of the drive rod 51, Figures 1 and 2, is journaled for rotation and axial reciprocation in the bushing 68 fixed in the end box 69 fixed to the right hand end of the bed of the lathe. Journaled against axial movement on the outside surface 68a of the bushing 68 is the cup member 70 of the rapid traverse clutch indicated generally at 71. The cup member is constantly driven from the continuously operating rapid traverse motor 72 mounted on the right hand end of the lathe bed and having a sprocket 73 driving a chain 74 connected to the sprocket 75 formed on the cup member 70. Fixed on the rod 51 is the mating cone member 76 of the rapid traverse clutch 71. An annular groove or spool is provided at 77 on the cone member which is engaged by a lever 78 connected to the length traverse solenoid LTS suitably mounted on the machine frame so that when this solenoid is energized the cone member 76 and the rod 51 are moved to extreme right position to connect the rapid traverse drive from the motor 72 to rapidly rotate the rod 51.

Power take off for both feed and rapid traverse movements to the rear tool slide 25 may be had from the sprocket 79 formed on the cone member 76 through the chain 80 and the sprocket 81 on the input shaft 82 of the rear tool slide transmission indicated generally at 83, this transmission comprising suitable gearing 84, 85, and 86, the cam drum 87, and the roller 88 fixed on the tool slide 25 to effect the transverse movements for the tool 27.

The feed clutch 53—54 is engaged and disengaged, when solenoid LTS is de-energized, by the operation of a reciprocatable trip bar 89 which is suitably mounted on supports 90 and 91 for longitudinal movement on the front of the lathe bed just below the apron 18. A tension spring 92 between a pin 93 fixed to the machine frame and a pin 94 fixed to the trip bar, causes the bar to be normally urged to the right, Figures 1 and 2. On the left hand end of the trip bar is fixed the block 95 by suitable rivets 96. A threaded stud 97 is fixed in the block and passes through the clearance hole 98 in a lug 17a formed integral with the feed box 17. Stop nuts 99 and 100 engage each side 101 and 102 respectively of the lug to accurately limit movement of the trip bar 89. The trip bar is connected to oppositely reciprocate the feed and rapid traverse rod 51 through a lever 103 pivotally mounted on the machine frame on a stud 104 pivotally connected at one end to the block 95 by a pin 105. The other end of the lever is received in the annular groove 106 formed in the clutch spool 52 on the rod 51.

Pivotally mounted on the stud 107 fixed in the apron 18 is the trip dog lever 108 which is adapted for swinging movement in a vertical plane 109. The lever has a depending trip finger 110 with an abutment face 111 adapted to engage the trip dog 112 adjustably clamped on the trip bar 89 as the carriage and apron feed toward the headstock of the lathe. When it is desired to operate the longitudinal movement of the carriage manually by the handwheel 65 without actuating the trip bar, the operator holds up on the lever keeping it in its upper position 108b from the normal position 108a so the trip finger will be rocked forward and will clear the trip dog 112.

Interlock mechanism is provided between the spindle start and stop lever 37 and the trip bar 89 so that the trip bar is normally held in feed disconnected position when the spindle is stopped. This mechanism comprises a bell crank lever 113, Figure 2, pivotally mounted on a suitable pin 114 carried on the machine frame and connected by a link 115 to the lever 37 and connected to the push rod 116 which has a yielding connection 117 with the latch member 118. When the lever 37 is in "stop" position 37a the trip bar is held in feed disengaged position by the latch pin member 118 extending down along the right side 119 of the latch dog 120 adjustably clamped on the trip bar. The yielding connection 117 enables the operator to at any time manually move the spindle control lever 37 to "stop" position even though the end 121 of the latch pin is on the top surface 122 of the latch dog 120 when the feed clutch 53—54 is engaged. Also under these conditions the operator may latch out the feed clutch 53—54 by moving the carriage to the left till the trip finger 110 engages the dog 112 and moves the trip bar till the latch plunger drops down, under the influence of the yielding connection 117, behind the face of the dog 120, the spindle control lever being in the "stop" position 37a at this time.

The cross slide 20 is actuated to predetermined "in" and "out" positions of cutting and tool relief respectively on the carriage by a reversable cross feed motor 123 which is mounted on the lathe apron 18. This motor is arranged to drive an axially reciprocatable worm shaft 124 carried by the apron and carriage through a suitable sliding driving connection 125. A worm 126 is fixed on the shaft 124 and is normally yieldingly held axially in an intermediate position by the compression springs 127 and 128 which react against suitable abutment surfaces 129 of the lathe carriage. The worm 126 is in engagement with a worm wheel 130 fixed on the usual cross feed screw 131 of the lathe which operates in the cross feed nut 132 fixed to the tool slide 20. Adjustable stop abutments, such as the screws 133 and 134, are provided on the lathe carriage to engage the respective abutment surfaces 135 and 136 of the cross slide 20 to limit its movement to definite predetermined "in" and "out" positions.

Fixed to the worm shaft 124 is the spool 137 which is engaged by a T-shaped lever 138 pivotally mounted on a suitable pin 139 carried in the lathe carriage. Each of the extending arms 138a and 138b of the lever are arranged to respectively engage and operate the limit switches LS—2 and LS—4 as the worm shaft is reciprocated axially upon engagement of the cross slide with either of the abutment screws 133 or 134 which causes one or the other of the springs 127 and 128 to yield when the rotation of the worm wheel and cross feed is stopped.

*Operation*

To put the machine in automatic operation the operator closes the main disconnect switch 140, Figure 3, to connect the power supply lines L—1, L—2, and L—3 to the operating circuit. The selector switch 141 is set to "on" position so as to interconnect leads 142 and 143. The "start" push button 144 is then pressed so as to connect spindle motor relay coil S with the lead 145 of the secondary winding 146 of the pilot circuit transformer 147, through the normally closed "stop" push button 148 to the other lead 149 of the secondary winding of the transformer. In thus energizing coil S contacts Sa are closed connecting power to the spindle motor 29. At the same time the holding contact Sb closes to maintain this circuit after the "start" button 144 has been released. At the same time the length traverse motor 72 is energized by connecting the length traverse relay coil LT through leads 142, selector switch 141, and lead 143 to the lead 149. This closes contacts LTa starting the length traverse motor 72 and also closes the control contact LTb which connects lead 142 wiht lead 150 to bring the remaining part of the control circuit into operation. During the normal automatic operation the spindle motor 29 and the length traverse motor 72 run continuously. In instances where coolant is required a coolant pump motor 151 may be cut into the circuit by pressing the selector switch 152 to "on" position.

The work spindle 28 is started for rotation of a workpiece W, Figure 4, by manually moving the spindle control lever to "run" position 37b, Figure 2, engaging the clutch 33 to connect driving power from the motor 29. A spindle stop solenoid SS mounted on the frame or headstock of the lathe has an armature 153 connected by a link 154 to the lever 37 so that when energized it moves the lever to "stop" position 37a. A dog 155 on the armature of the solenoid SS engages and closes the limit switch LS—6 when the spindle control lever is moved to "start" or "run" position 37b. Closing of limit switch LS—6 connects lead 142, through the normally closed contact TRa of the timer relay TR through the coolant pump motor relay coil CP to the lead 149. This closes contacts CPa to energize the coolant pump motor 151.

When the spindle control lever is in the "stop" position 37a the feed clutch 53—54 is held in disengaged poistion but when the lever is moved to the "run" position 37b the latch pin 118 is withdrawn from the dog 120 and the clutch 53—54 springs into engagement under the influence of the spring 92. The longitudinal movement of the trip bar to the right at this time causes a dog 156 carried on the trip bar to operate the limit switch LS—1 closing the circuit from lead 150 through the normally closed limit switch LS—2 and the cross feed motor 123 to the lead 149. Thus the cross feed motion and the longitudinal feed motion are taking place simultaneously as indicated by the diagonal line of tool travel 158 in Figure 4 to bring the cutting tool 22 into operating position 159 from the starting position 160.

The "in" feed of the tool slide 20 is stopped when it engages the stop screw 133 which causes the worm shaft 124 to shift axially to open limit switch LS—2 to de-energize the cross feed motor 123 so the cross slide 20 remains in cutting position against the set screw 133 as the longitudinal feed motion continues along the line 161, Figure 4. The longitudinal feeding of the carriage continues until the trip finger 110 on the apron engages the dog 112 to shift the trip bar to the left to disengage the feed clutch 53—54 with the cutting tool at the point 162, Figure 4. A dog 157 on the trip bar 89 closes limit switch LS—3 which connects lead 150 through the timing relay coil TR to the lead 149. This causes an immediate closing of the contact TRb to complete a circuit from lead 150 through the normally closed limit switch LS—4 and the cross feed motor 123 to the lead 149 to start this motor in the opposite direction to withdraw the cross slide outwardly from the work as indicated by the line 163, Figure 4. This out feed motion of the cross slide 20 continues until it engages the stop screw 134 which causes the shifting of the worm shaft 123 and the opening of the limit switch LS—4 which de-energizes the motor 123 to hold the cross slide in the "out" or tool relief position shown at 164 in Figure 4.

After a predetermined time delay or dwell at the position 164 has taken place by the timer portion TRy, indicated in broken line in Figure 3, of the timer relay TR, the timer contact TRa opens to cut off the coolant pump motor and the timer contact TRc closes connecting lead 150 through the normally closed limit switch LS—5 to lead 158 connected to the longitudinal rapid traverse relay coil LTSR and to the spindle stop relay coil SSR, both of which coils are connected to the lead 149. Energizing coil LTSR closes contacts LTSRa which energizes solenoid LTS to move the drive rod 51 still further to the right in feed disengaged direction to engage the rapid traverse clutch 71 to rapidly rotate the rod 51 for quick return of the carriage and apron to the right along line 165, Figure 4, to starting position 160. Energizing coil SSR closes contacts SSRa which energizes solenoid SS which moves the spindle control lever 37 back to stop position 37a to stop work spindle rotation. It will be noted that whenever the lever is moved to "stop" position 37a the limit switch LS—6 is opened so as to shut off coolant when the spindle is stopped. The rear cutting tool 27 follows the path indicated by the line 166 in Figure 4, moving from the starting position 167 to end of cut at 168 at feed and returning at rapid traverse to the starting position.

When the carriage reaches the end of its right hand travel and arrives at the starting position, a limit switch LS—5, which is adjustably clamped to the bed ways 13 for any desired starting position for the carriage, is engaged by the carriage so as to open to de-energize both coils LTSR and SSR to respectively de-energize the solenoid LTS to stop the traverse movement of the carriage and the solenoid SS so as to free the spindle control lever for manual operation to start the next operating cycle. For manual operation without the automatic cycle, the selector switch 141 is set to "off" position so that only the spindle motor is put in operation with the remainder of the electric circuit de-energized.

Having thus fully set forth and described this invention, what is claimed is:

1. In a control mechanism for a lathe having a bed, a headstock having a headstock transmission, a main drive motor for driving said headstock transmission, a carriage and apron longitudinally reciprocatable on said bed, and a feed box on the left hand end of said bed and driven from said headstock, an output shaft in said feed box, an axially reciprocatable drive rod extending longitudinally of said bed, means for connecting said drive rod to gearing in said apron to effect longitudinal movement of the carriage, feed clutch means between said output shaft of the feed box and the left hand end of said drive rod, and means for engaging said feed clutch means by the axial movement of said drive rod toward said feed box comprising a trip bar extending longitudinally of the bed of the lathe, means for normally urging said trip bar away from said feed box, means interconnecting said drive rod and said trip bar for opposite reciprocatory movement means on said trip bar adapted to be actuated during the longitudinal movement of said carriage toward said feed box to effect movement of said drive rod away from said feed box to discharge said feed clutch means and arrest longitudinal feeding movement of said carriage, a rapid traverse drive motor, rapid traverse clutch means between said rapid traverse drive motor and said drive rod, and means for axially moving said drive rod further in feed disengaged direction to the right to engage said rapid traverse clutch means to effect rapid longitudinal movement of said carriage in the opposite direction in rapid return movement from said feed movement.

2. In a control mechanism for a lathe having a bed, a headstock having a headstock transmission, a main drive motor for driving said headstock transmission, a carriage and apron longitudinally reciprocatable on said bed, and a feed box on the left hand end of said bed and driven from said headstock, an output shaft in said feed box, an axially reciprocatable drive rod extending longitudinally of said bed, means for connecting said drive rod to gearing in said apron to effect longitudinal movement of the carriage, feed clutch means between said output shaft of the feed box and the left hand end of said drive rod, and means for engaging said feed clutch means by the axial movement of said drive rod toward said feed box comprising a trip bar extending longitudinally of the bed of the lathe, means for normally urging said trip bar away from said feed box, means interconnecting said drive rod and said trip bar for opposite reciprocatory movement, means on said trip bar adapted to be actuated during the longitudinal movement of said carriage toward said feed box to effect movement of said drive rod away from said feed box to disengage said feed clutch means and arrest longitudinal feeding movement of said carriage, a rapid traverse drive motor, rapid traverse clutch means between said rapid traverse drive motor and said drive rod, and means for axially moving said drive rod further in feed disengaged direction to the right to engage said rapid traverse clutch means to effect rapid longitudinal movement of said carriage in the opposite direction in rapid return movement from said feed movement, said means for further axially moving said drive rod to engage said rapid traverse clutch means including electrically actuated means, and electrical control means operated by the movement of said trip bar to feed disengaged position to energize said electrically actuated means.

3. In a control mechanism for a lathe having a bed, a headstock having a headstock transmission, a main drive motor for driving said headstock transmission, a carriage and apron longitudinally reciprocatable on said bed, and a feed box on the left hand end of said bed and driven from said headstock, an output shaft in said feed box, an axially reciprocatable drive rod extending longitudinally of said bed, means for connecting said drive rod to gearing in said apron to effect longitudinal movement of the carriage, feed clutch means between said output shaft of the feed box and the left hand end of said drive rod, and means for engaging said feed clutch means by the axial movement of said drive rod toward said feed box comprising a trip bar extending longitudinally of the bed of the lathe, means for normally urging said trip bar away from said feed box, means interconnecting said drive rod and said trip bar for opposite reciprocatory movement, means on said trip bar adapted to be actuated during the longitudinal movement of said carriage toward said feed box to effect movement of said drive rod away from said feed box to disengage said feed clutch means and arrest longitudinal feeding movement of said carriage, a rapid traverse drive motor, rapid traverse clutch means between said rapid traverse drive motor and said drive rod, and means for axially moving said drive rod further in feed disengaged direction to the right to engage said rapid traverse clutch means to effect rapid longitudinal movement of said carriage in the opposite direction in rapid return movement from said feed movement, said means for further axially moving said drive rod to engage said rapid traverse clutch means including electrically actuated means, and electrical control means operated by the movement of said trip bar to feed disengaged position to energize said electrically actuated means, and further electrical control means operated by the movement of said carriage in rapid return movement to a predetermined position to de-energize said electrically actuated means to arrest movement of said carriage.

4. In a control for a lathe having a bed, a headstock having a headstock transmission, a main drive motor for driving said headstock transmission, a carriage and apron longitudinally reciprocatable on said bed and a feed box on the left hand end of said bed and driven from said headstock, an output shaft in said feed box, an axially reciprocatable drive rod extending longitudinally of said bed, means for connecting said drive rod to gearing in said apron to effect longitudinal movement of the carriage, feed clutch means between said output shaft of the feed box and the left hand end of said drive rod, and means for engaging said feed clutch means by the axial movement of said drive rod toward said feed box comprising a trip bar extending longitudinally of the bed of the lathe, means for normally urging said trip bar away from said feed box, means interconnecting said drive rod and said trip bar for opposite reciprocatory movement, means on said trip bar adapted to be actuated during the longitudinal movement of said carriage toward said feed box to effect movement of said drive rod away from said feed box to disengage said feed clutch means and arrest longitudinal feeding movement of said carriage; a rapid traverse drive motor, rapid traverse clutch means between said rapid traverse drive motor and said drive rod, and means for axially moving said drive rod further in feed disengaging direction to the right to engage said rapid traverse clutch means to effect rapid longitudinal movement of said carriage in the opposite direction in rapid return movement from said feed movement, said means for further axially moving said drive rod to engage said rapid traverse clutch means including electrically actuated means, and electrical control means operated by the movement of said trip bar to feed disengaged position to energize said electrically actuated means, and further electrical control means operated by the movement of said carriage in rapid return movement to a predetermined position to de-energize said electrically actuated means to arrest movement of said carriage, and render said main drive motor ineffective to drive said headstock transmission.

5. In control apparatus for a lathe having a bed, a headstock having a headstock transmission, a main drive motor for driving said headstock transmission, a carriage and apron longitudinally reciprocatable on said bed, and a feed box on the left hand end of said bed and driven from said headstock, an output shaft in said feed box, an axially reciprocatable drive rod extending longitudinally of said bed, means for connecting said drive rod to gearing in said apron to effect longitudinal movement of said carriage, feed clutch means between said output shaft of the feed box and the left hand end of said drive rod, and means for engaging said clutch means by the axial movement of said drive rod toward said feed box comprising a trip bar extending longitudinally of the bed of the lathe, means for normally urging said trip bar away from said feed box, means interconnecting said drive rod and said trip bar for opposite reciprocatory movement, means on said trip bar adapted to be actuated during the longitudinal movement of said carriage toward said feed box to effect movement of said drive rod away from said feed box to disengage said feed clutch and arrest longitudinal feeding movement of said carriage, means for connecting or disconnecting said main drive relative to said headstock transmission including a spindle control lever having a stop and run position for the work spindle of said headstock transmission, and an interlock mechanism between said spindle control lever and said trip bar arranged to hold said trip bar and drive rod in feed disengaged position when said spindle control lever is in the stop position.

6. In a control mechanism for a lathe having a bed, a headstock having a headstock transmission, a main drive motor for driving said headstock transmission, a carriage and apron longitudinally reciprocatable on said bed, and a feed box on the left hand end of said bed and driven from said headstock, an output shaft in said feed box, an axially reciprocatable drive rod extending longitudinally of said bed, means for connecting said drive rod to gearing in said apron to effect longitudinal movement of said carriage, feed clutch means between said output shaft of the feed box and the left hand end of said drive rod, and means for engaging said clutch means by the axial movement of said drive rod toward said feed box comprising a trip bar extending longitudinally of the bed of the lathe, means for normally urging said trip bar away from said feed box, means interconnecting said drive rod and said trip bar for opposite reciprocatory movement, means on said trip bar adapted to be actuated during the longitudinal movement of said carriage toward said feed box to effect movement of said drive rod away from said feed box to disengage said feed clutch and arrest longitudinal feeding movement of said carriage, means for connecting or disconnecting said main drive motor relative to said headstock transmission including a spindle control lever having a stop and a run position for the work spindle of said headstock transmission, an interlock mechanism between said spindle lever and said trip bar arranged to hold said trip bar and drive rod in feed disengaged position when said spindle control lever is in stop position, and a yielding connection in said interlock mechanism to allow movement of said spindle control lever to stop position when said trip bar and drive rod are in feed engaged position.

7. In a control mechanism for a lathe having a rotatable work spindle, electric drive means for said work spindle, a cutting tool, first means for moving a cutting tool in longitudinal movement, a second means for moving said cutting tool in transverse movement, an electrical control circuit operable to cause both of said first and second moving means to operate simultaneously to move said cutting tool diagonally relative to the work spindle axis from a starting position to a cutting position, means in said control circuit to stop the in feed movement of the tool toward the work spindle axis while continuing the longitudinal movement of the tool parallel to said axis, mechanical means operated by the longitudinal movement of the tool to a predetermined position to arrest said longitudinal movement and cause said second means to move the tool outwardly from said spindle axis to a tool relief position, electric dwell means rendered operative at the beginning of said outward transverse movement of the tool to delay the initiation of a rapid longitudinal return movement of the tool to starting position by said first means until after the completion of said outward transverse movement.

8. In a control mechanism for a lathe having a rotatable work spindle, electric drive means for said work spindle, a cutting tool, first means for moving a cutting tool in longitudinal movement, a second means for moving said cutting tool in transverse movement, an electrical control circuit operable to cause both of said first and second means to operate simultaneously to move said cutting tool diagonally relative to the work spindle from a starting position to a cutting position, means in said control circuit to stop the in feed movement of the tool toward the work spindle axis while continuing the longitudinal movement of the tool parallel to said axis, mechanical means operated by the longitudinal movement of the tool to a predetermined position to arrest said longitudinal movement and cause said second means to move the tool outwardly from said spindle axis to a tool relief position, electric dwell means rendered operative at the beginning of said outward transverse movement of the tool to delay the initiation of a rapid longitudinal return movement of the tool to starting position by said first means until after the completion of said outward transverse movement, and further electrical control means operated by said electrical dwell means to delay the de-energizing of said electric drive means for stopping of the rotation of the work spindle until the beginning of said rapid return longitudinal movement of the tool.

9. In a control mechanism for a lathe having a rotatable work spindle, electric drive means for said work spindle, a cutting tool, first means for moving a cutting tool in longitudinal movement, a second means for moving said cutting tool in transverse movement, an electrical control circuit operable to cause both of said first and second means to operate simultaneously to move said cutting tool diagonally relative to the work spindle axis from a starting position to a cutting position, means in said control circuit to stop the in feed movement of the tool toward the work spindle axis while continuing the longitudinal movement of the tool parallel to said axis, mechanical means operated by the longitudinal movement of the tool to a predetermined position to arrest said longitudinal movement and cause said second means to move the tool outwardly from said spindle axis to a tool relief position, electric dwell means rendered operative at the beginning of said outward transverse movement of the tool to delay the initiation of a rapid longitudinal return movement of the tool to starting position by said first means until after the completion of said outward transverse movement, an electrically actuated coolant supply system, and further electrical control means operated by said electrical dwell means to delay through electric circuit means the de-energizing of said electrical drive means for the work spindle and the de-energizing of the electrically actuated coolant supply system until the beginning of said rapid return movement of the cutting tool to starting position.

HAROLD J. SIEKMANN.
HARRY C. KEMPER
NELSON D. COOPER.

REFERENCES CITED

The following references are of record in the file of this patent:

UNITED STATES PATENTS

| Number | Name | Date |
| --- | --- | --- |
| 764,109 | Chard | July 5, 1904 |
| 1,399,199 | Eades | Dec. 6, 1921 |
| 2,011,486 | Kingsbury | Aug. 13, 1935 |
| 2,032,598 | Shaw | Mar. 3, 1936 |
| 2,368,408 | Brooking | Jan. 30, 1945 |
| 2,484,616 | Dulaney | Oct. 11, 1949 |
| 2,489,203 | Siekmann | Nov. 22, 1949 |